(No Model.)

J. M. WILLCOX.
MACHINERY FOR COMPRESSING AND MOLDING POWDERY AND PASTY SUBSTANCES.

No. 309,118. Patented Dec. 9, 1884.

Witnesses:

Inventor:
James M. Willcox
by Marcellus Bailey
his attorney

United States Patent Office.

JAMES M. WILLCOX, OF PHILADELPHIA, PENNSYLVANIA.

MACHINERY FOR COMPRESSING AND MOLDING POWDERY AND PASTY SUBSTANCES.

SPECIFICATION forming part of Letters Patent No. 309,118, dated December 9, 1884.

Application filed August 20, 1884. (No model.)

*To all whom it may concern:*

Be it known that I, JAMES M. WILLCOX, of Philadelphia, in the State of Pennsylvania, have invented a certain new and useful Improvement in Machinery for Compressing and Molding Powdery and Pasty Substances, of which the following is a specification.

In an application for Letters Patent, filed June 16, 1884, and bearing Serial No. 135,051, I have described and shown a machine for compressing and molding powdery and pasty substances, wherein peripherally-grooved rolls for molding and compressing the substance are combined with separators for subdividing wholly or partially the molded mass, and lifters for detaching said subdivided portions from the rolls. In that machine the lifters are made separate from and do not move with the rolls.

My present invention is an improvement upon a machine of the kind referred to; and it consists in arranging the lifters so that they are carried by and move with the rolls, whereby I can utilize the same devices both as lifters and also as separators.

The nature of my improvement can best be explained and understood by reference to the accompanying drawings, in which—

Figure 1:
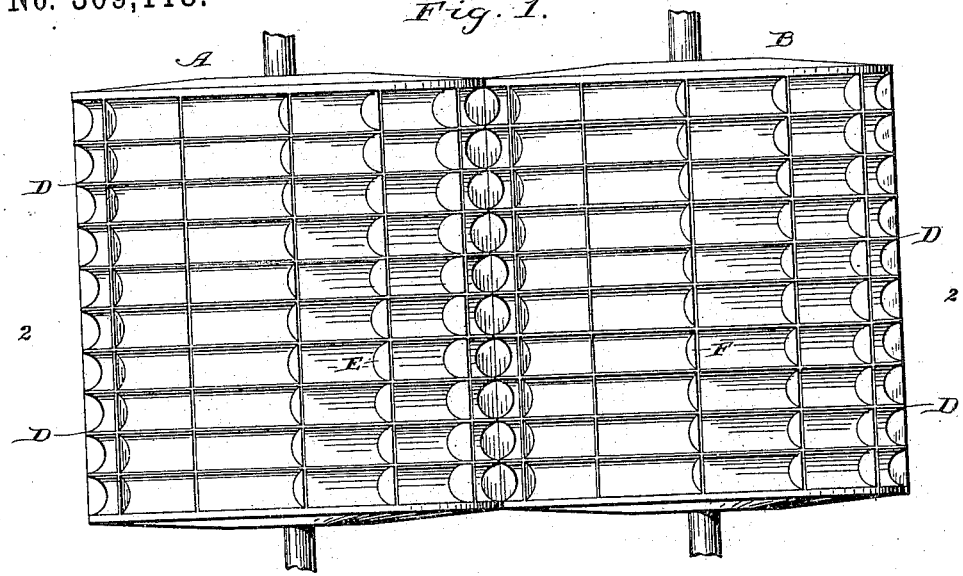
Figure 2:
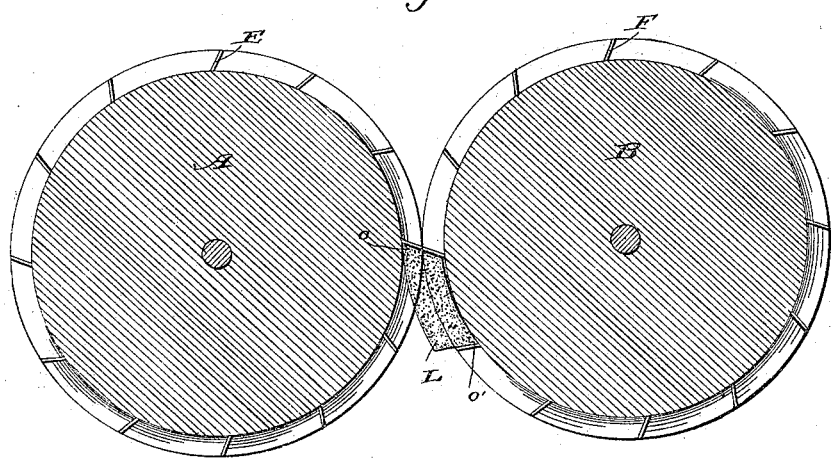

Figure 1 is a plan of compressing and molding rolls embodying my invention in its preferred form. Fig. 2 is a section on line 2 2, Fig. 1.

I have omitted from the drawings the feed-hopper, which stands over the rolls so as to deliver the substance at the point between the two rolls, and also the supporting-frame and the roll-driving gearing. These parts are within the knowledge of and can readily be supplied by the skilled mechanic.

A B are the two press-rolls, counterparts of one another. They are preferably made of iron, and have circumferential grooves C formed in them by planing or turning. The grooves in the two rolls match one another, and the rolls are set up together, so that the dividing walls D of the grooves of the one roll meet and have contact with the dividing walls of the other roll. Roll A is provided with separators E, and roll B with separators F. These separators are thin partitions, preferably of metal, set in the grooves at definite intervals apart, and so placed as to match or meet one another as the rolls revolve. The material passing between the rolls is molded and compressed in the grooves, and the separators act to wholly, or nearly wholly, sever the product into definite lengths at the moment of compression.

To prevent the molded mass from sticking in the grooves it is requisite to employ some means for detaching it, which means I have designated, for convenience' sake, "lifters." In my prior application, hereinbefore referred to, these lifters are devices which are independent of and separate from the rolls. In my present machine, however, the lifters are carried by and move with the rolls, and act at once in the dual capacity of separators and lifters as well. It is this feature which characterizes my improvement.

To effectuate my invention the partitions E F of the two rolls are made slanting, and are arranged relatively to one another substantially in the manner indicated in Fig. 2. The slant of the partitions is such that on the interior opposite faces of the rolls (where the compression is effected) in each subdivision of the grooves the upper face of the lower partition of that subdivision in one of the rolls—as, for instance, the partition F in roll B—will form an acute angle with the bottom of the groove, while the under face of the upper partition, E, of the corresponding subdivision in the other roll, A, will stand at an acute angle to the bottom of the groove in that roll. In each subdivision there will thus be an acute angle at the top of the subdivision in one of the rolls—as, for instance, A—and an acute angle at the lower and opposite corner of the subdivision in the other roll—as, for instance, B—and, as the partitions in each roll have the same slant, each set of partitions E F as they meet are in line and constitute a prolongation one of the other, as indicated in Fig. 2. The result in this arrangement is as follows, supposing the rolls to be revolving in the direction of the arrows in Fig. 2: The compressed mass passing down between the rolls will be jammed into the subdivisions of the grooves and squeezed into the acute angle at the bottom of each subdivision in the roll B and the acute angle at the top of each subdivision in roll A. The compressed mass being thus held at these two points, the forward or lower end of the mass will naturally leave roll A and follow roll B, and the rear or upper end of the mass will, for the same reason, follow A and leave B. The lump, therefore, being held at one end by one roll, and at the other end by the other roll, will be detached from the grooves as the latter diverge, and will finally, when nearly in horizontal position, drop from the rolls. This action is indicated in Fig. 2, where L represents a molded lump held at the lower corner in the angle $o'$ of roll B, and at the upper diagonally-opposite corner in the angle $o$ of roll A. By the divergence of the lower partitions of the subdivision in question the lump has been detached from the roll A, except at the upper corner, and has been compelled to follow roll B. As soon as the rolls in their revolution cause the upper partitions to diverge the lump will be detached in like manner from roll B, and will be held only at the corners $o$ $o'$, until by the divergence of these corners it is detached therefrom and falls from the rolls. I thus simply and efficaciously use the same devices both as separators and as lifters.

Having described my improvement and the best way known to me of carrying the same into practical effect, I state, in conclusion, that I do not restrict myself to the special devices herein shown and described, for it is manifest that the same can be varied considerably without departure from the spirit of my invention. What is essential is that in each subdivision there should be such a formation or construction of parts that one roll will take sufficient hold on the leading end of the lump to draw that end along with it far enough to detach the body of the lump from the face of the groove in the other roll, and that the other roll will take sufficient hold on the rear end of the lump to draw that end along with it far enough to detach the body of the lump from the face of the groove in the first-named roll, and it is this formation or construction that I desire to be understood as including under the term "slanting partitions."

What I claim as new and of my own invention is—

The combination, with circumferentially-grooved press-rolls, of slanting partitions arranged with relation to one another, and adapted to operate upon the molded masses passing between the press-rolls, substantially in the manner and for the purposes hereinbefore set forth.

In testimony whereof I have hereunto set my hand this 30th day of July, 1884.

JAMES M. WILLCOX.

Witnesses:
R. W. LESLEY,
MICHAEL J. GLENNEN.